Nov. 2, 1965   J. L. BALDWIN   3,215,459
JOINT FOR MOTORCYCLE FRAMES AND THE LIKE
Filed Feb. 4, 1964
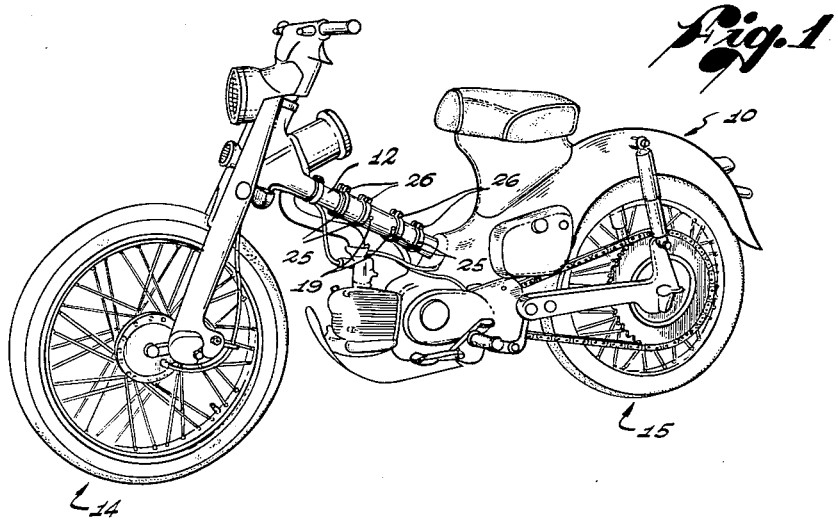
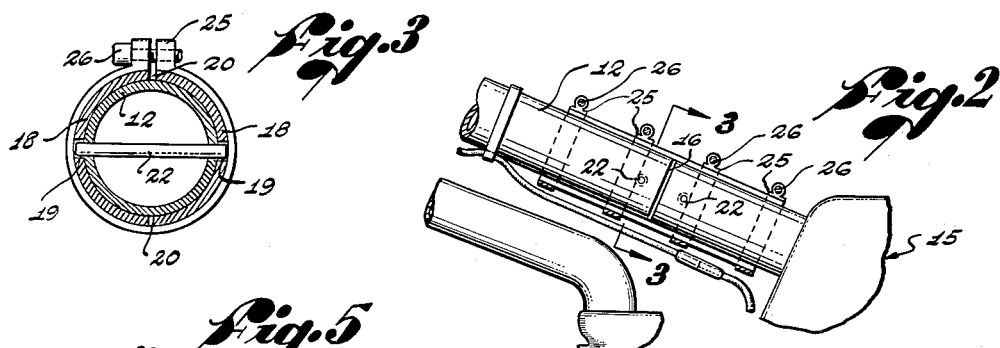
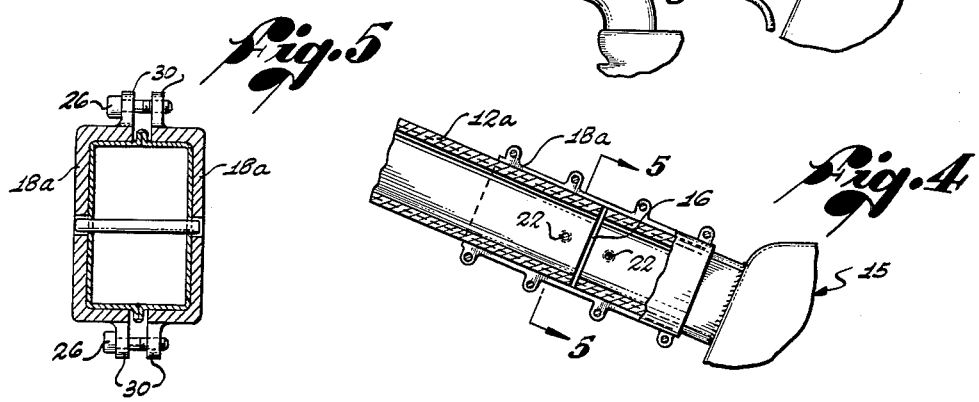
INVENTOR.
JAMES L. BALDWIN
BY Forrest J. Lilly
ATTORNEY

United States Patent Office 3,215,459
Patented Nov. 2, 1965

3,215,459
JOINT FOR MOTORCYCLE FRAMES AND THE LIKE
James L. Baldwin, Pacoima, Calif.
(12123 Branford St., Sun Valley, Calif.)
Filed Feb. 4, 1964, Ser. No. 342,369
1 Claim. (Cl. 287—111)

The present invention relates generally to motorcycles and similar vehicles having frames made of one or more tubular members; and more especially is the invention concerned with a method and means for detachably connecting together sections of a vehicle frame bar so that the vehicle can be broken down into two loads for greater portability.

Although the invention is herein disclosed in connection with a particular design of motorcycle, it will be understood that the invention is not necessarily limited thereto. It can be applied equally well to bicycles or other varieties of powered two-wheeled vehicles, including scooters. Likewise, more than one splice or joint may be provided in the event thta more than one frame bar must be cut in order to divide the vehicle into two loads.

There are times when it is desired to carry a motorcycle, especially one of the trail variety, in a station wagon, automobile, or aeroplane, in order to have the motorcycle available for cross country transportation or trail travel at the end of a trip made in the larger vehicle. Portability of the motorcycle is greatly increased if the motorcycle can be divided into two smaller separate loads. The smaller loads are easier to handle and to store away in an automobile or in an aeroplane than is the case of the entire motorcycle; and particularly in the case of an aeroplane is this characteristic desirable in order to obtain proper balancing of the entire load of the aeroplane. Thus the ability to break the motorcycle down into two separate loads, carry it to a remote place, and there assemble it quickly and easily to provide a means of localized ground transportation, greatly increases the value of the motorcycle to sportsmen and travelers.

Hence it is a general object of the present invention to provide means for quickly and easily splicing together a frame bar or bars, of a motorcycle or the like.

It is a further object to provide such a means that is simple in construction and design and can be installed with only the tools normally present in a vehicle tool kit.

It is a further object of the present invention to provide splice means of this character that can be packaged and sold as a kit to motorcycle owners who wish to modify their own vehicles in this way, such splice means being quickly and easily installed by the owner.

These objects are achieved in a splicing structure for rigidly interconnecting two sections of a frame bar of a motorcycle or the like by providing a plurality of splice members that collectively surround a frame bar and conform to the external shape of the bar, pilot pin means engaging the splice members and the frame bar to orient the two frame bar sections both axially and angularly relative to each other in order to restore the motorcycle to its original size and shape when the splice structure is assembled, and detachable clamp means holding the splice members in place on the frame bar in order to restore the frame bar to its original function and permit the motorcycle to be used for travel over the road. The pilot pin means preferably include a pair of metal pins which are permanently carried one on each end of the two frame bar sections and which extend beyond the frame bar in order to be received by the splice members. These splice members are provided with holes conforming in shape to the pins in order to receive the pins with slight clearance, thus orienting the two sections of the frame bar with respect to each other as mentioned above.

How the above objects and advantages of the present invention, as well as others not specifically mentioned, are achieved will be better understood by reference to the following description and to the annexed drawing, in which:

FIG. 1 is a perspective of a typical motorcycle to which the present invention has been applied;

FIG. 2 is an enlarged side elevation of the frame bar with the splicing structure in place, one of the two splice members being removed for purposes of illustration;

FIG. 3 is a transverse section on line 3—3 of FIG. 2;

FIG. 4 is a view similar to FIG. 3 of a modified form of the invention adapted to fit a tubular frame bar of rectangular outline; and FIG. 5 is a transverse section on line 5—5 of FIG. 4.

Referring now to the drawing, and particularly to FIG. 1, there is illustrated a motorcycle 10 as exemplary of the type of vehicle to which the present invention may be applied advantageously. It will be noticed that the vehicle 10 has a single fore-and-aft frame bar 12 which interconnects the front end and rear end assemblies 14 and 15, respectively. With a vehicle frame of this design, it is only necessary to cut the single bar 12 in order to separate the front and rear assemblies 14 and 15 into two separate loads. In some types of frames with familiar triangle construction, it is required that two frame bars be cut; but it will be understood that with such a frame the present invention may be used by applying duplicate splices to each of the two frame bars that are cut.

The splice structure is shown in greater detail in FIGS. 2 and 3, applied to frame bar 12 which has been cut at 16. Frame bar 12 is a round tubular member. Accordingly the two duplicate splice members 18 are each semicylindrical. They may be conveniently made from a piece of steel tubing which is cut to the proper length, drilled diametrically at two positions to provide the holes 19 which will be described more fully, and then divided longitudinally into two similar halves 18. It is obviously desirable that the internal diameter of the tubing from which the splice member is made equal the outside diameter of frame member 12 in order that the splice members may conform closely to the external shape of the frame member. However, cutting the original tubing longitudinally leaves two small gaps 20 which extend longitudinally of the splice members on opposite sides thereof. A small clearance at these positions is desirable in order to insure maximum contact between the splice members and the frame bar, although at the same time the splice members are designed to surround substantially the frame bar in order to provide maximum strength.

Each of the splice members 18 is provided with a pair of holes 19 extending through the wall, the holes being spaced equal distances from the midpoint of the splice member. When the two splice members are in place around the frame member as shown in FIG. 3, holes 19 in the two splice members are arranged in diametrically aligned pairs; and each pair of holes 19 is thus arranged to receive the projecting ends of a pilot pin 22.

Pilot pin means in the form of a pair of pilot pins 22 are provided. The pilot pins are located at either side of the cut 16 forming the break in the frame bar, and are mounted in the frame bar in what may be regarded as a permanent manner. The holes in the splice members 18 are slightly larger than the diameter of the pilot pins in order that the splice members may slide easily over the pilot pins in the process of assembling the spliced structure. The slight clearance between the holes and the pilot pins may be reduced to an easy sliding fit if desired; but it is preferred that the clearance be somewhat larger than a sliding fit in order to allow for slight inaccuracies in locating the pins in the frame bar.

The entire splice structure is held assembled by clamp means which in this embodiment of the invention is provided by a plurality of individual split ring clamps 25, each of which includes and is tightened by a bolt or machine screw 26. When relaxed, the split rings slide over the surface of the two splice members to be brought into the desired position; and bolts 26 are then tightened. Clamps 25 press the splice members into firm engagement with the outer surface of the frame bars.

The construction and use of the splice structure will be better understood from an understanding of a preferred method of installing the clamp on the motorcycle frame bar 12. Assuming that frame bar 12 is originally intact, the two duplicate splice members 18 are placed over the frame bar at opposite sides thereof, care being taken that the spaces 20 between the longitudinal edges of the splice members are as nearly equal as possible at the two sides of the frame bar. This precaution assists in aligning holes 19 properly. In this position, the two splice members are then clamped in place by any suitable means.

Next, four holes are drilled in the frame bar at the position of the four holes 19, using the splice members as templates to locate and guide the drill during the drilling operation. This produces two pairs of holes, the members of each pair being diametrically aligned with each other. A pilot pin 22 is now driven through the frame bar through each pair of holes therein. The size of the holes drilled in the frame bar is preferably chosen with reference to the size of the pilot pins in such a way that the pins are a driving fit within these drilled holes. This results in a permanent installation of the pins in the frame bar when they are driven into the position shown in which they project at their ends beyond the frame bar.

Either before or after driving the pilot pins in place, the splice members are removed and the frame bar is then cut at 16 at a point which is preferably midway between the two pilot pins. The frame bar is now in two sections, each terminating at the cut 16 and each section carrying a pilot pin 22. Installation of the splicing structure is completed by slipping two of the split ring clamps 25 on each of the frame bar sections.

It will normally be necessary to accompany installation of the splicing structure with certain other additional operations. Such auxiliary steps may include provision of suitable connector for electrical conductors, a throttle control rod, or other operating elements which extend between the front end assembly and the rear end assembly. However, the treatments to be accorded such members will be obvious to persons skilled in the art and constitute no part of the present invention; and accordingly they are not discussed here in detail.

Once installed, the splicing structure is very easily assembled to interconnect rigidly the two sections of frame member 12 merely by positioning the two splicing members at opposite sides of the frame bar, inserting the ends of the pilot pins in holes 19 in the splice members so that the latter may be brought into contact with the frame bar, and tightening up the clamping means to hold all the members firmly in assembled position. Disassembly of the splicing structure is accomplished simply by substantially reversing the steps as just referred to.

The splicing structure so far described has been designed to fit onto a frame bar of circular cross-section since this is the most commonly encountered shape of frame bar. However, it will be readily understood that the splicing structure can be easily adapted to frame bars of other exterior shapes. As an illustration of one such adaptation, there is shown in FIGS. 4 and 5 a splicing structure which is designed to fit a tubular frame bar of externally rectangular shape. The construction and installation of this modification of the invention will be readily understood from the foregoing description, since the splicing structure is constructed as already described, except for one change which will be described. In this embodiment, the splice members 18a are two castings molded to fit exactly the frame bar. Since the splice members 18a are formed in this manner, it is a simple matter to add to them integral projecting bosses 30 along the opposing longitudinal edges of the splice members. Thus in this embodiment of the invention, the clamping means are reduced to bolts 26 which are received at one end in screw-threaded openings in bosses 30. Thus by tightening the bolts, the splice members are tightened around the frame bar.

From the foregoing description of the present invention, it will be evident that various changes in the detailed arrangement and construction of parts may occur to persons skilled in the art without departing from the spirit and scope of the present invention. Accordingly, it is to be understood that the above description is considered to be illustrative of, rather than limitative upon, the invention as defined by the appended claim.

I claim:

A disassemblable splicing structure for rigidly interconnecting two sections of a frame bar of a motorcycle or the like, comprising:
  a pair of splice members adapted to hold between them the frame bar and to conform to the external shape thereof;
  a pair of pilot pins permanently mounted respectively in a fixed location on one of the frame bar sections and projecting at each end beyond the frame bar section;
  each splice member having a pair of longitudinally spaced holes each adapted to receive with slight clearance the projecting end of one pin to orient the frame sections axially and angularly with respect to each other;
  and a plurality of clamping rings slidable over the splice members and each including means to tighten the ring around the splice members to hold the latter firmly in position.

References Cited by the Examiner

UNITED STATES PATENTS

| 141,296 | 7/73 | Stone | 287—111 |
|---|---|---|---|
| 147,837 | 2/74 | Heginbothom | 287—111 |
| 157,427 | 12/74 | Stuart | 287—111 |
| 1,357,894 | 11/20 | Pearsall | 285—373 |
| 1,420,430 | 6/22 | Jaeckle et al. | 287—111 |
| 1,458,666 | 6/23 | Stoppello | 287—111 |
| 2,211,164 | 8/40 | Rippenbein | 280—287 |
| 2,378,525 | 6/45 | Abegg | 29—401 |
| 2,705,156 | 3/55 | Torre | 280—287 |
| 2,746,769 | 5/56 | Hoogendoorn | 280—287 |
| 2,787,051 | 3/57 | Risley | 29—401 |

BENJAMIN HERSH, *Primary Examiner.*

KENNETH H. BETTS, *Examiner.*